(12) United States Patent
Kallinen

(10) Patent No.: US 6,386,481 B1
(45) Date of Patent: May 14, 2002

(54) ARRANGEMENT FOR FASTENING STRINGERS TO AIRCRAFT WING RIBS

(75) Inventor: Risto Kallinen, Espoo (FI)

(73) Assignee: Patria Finavicomp Oy, Halli (FI)

( * ) Notice: Subject to any disclaimer, the term of this patent is extended or adjusted under 35 U.S.C. 154(b) by 0 days.

(21) Appl. No.: 09/757,268

(22) Filed: Jan. 8, 2001

(51) Int. Cl.$^7$ ................................. B64C 3/18
(52) U.S. Cl. ................. 244/123; 244/219; 244/35 R
(58) Field of Search ................. 244/123, 219, 244/35 R, 5, 124, 215

(56) References Cited

U.S. PATENT DOCUMENTS

| | | | |
|---|---|---|---|
| 3,920,206 A | 11/1975 | Bigham et al. | 244/132 |
| 4,667,905 A | 5/1987 | Hamm et al. | 244/123 |
| 5,251,849 A | * 10/1993 | Torres | 244/117 R |
| 5,501,414 A | 3/1996 | Bauer | 244/124 |
| 6,027,074 A | * 2/2000 | Cameron et al. | 244/133 |
| 6,045,096 A | * 4/2000 | Rinn et al. | 244/219 |
| 6,173,924 B1 | * 1/2001 | Young et al. | 244/215 |
| 6,173,925 B1 | * 1/2001 | Mueller et al. | 244/219 |

FOREIGN PATENT DOCUMENTS

| | | |
|---|---|---|
| DE | 2413654 | 9/1975 |
| DE | 3003552 | 8/1981 |
| DE | 19844035 | 11/1999 |
| EP | 0624513 | 11/1994 |
| EP | 0976650 | 2/2000 |
| WO | 8501489 | 11/1985 |
| WO | 8809289 | 12/1988 |
| WO | 9939976 | 8/1999 |

* cited by examiner

Primary Examiner—Charles T. Jordan
Assistant Examiner—Timothy D. Collins
(74) Attorney, Agent, or Firm—Ladas & Parry

(57) ABSTRACT

An arrangement for fastening stringers of an aircraft wing to a transverse wing rib in the wing. An elongated fastening element is arranged to the side of the wing rib comprising a plate-like flexible portion close to the wing rib, and the first longitudinal edge of the flexible portion is fastened to the side of the wing rib and the second free longitudinal edge comprises a stiffening portion. The ends of the stiffening portion also comprise fastening portions, from where the fastening element is fastened to the stringers. The flexible portion in the fastening element is formed to be flexible in the longitudinal direction of the wing rib, and by bending the flexible portion in the longitudinal direction of the wing rib the stiffening portion can if necessary be transferred during the assembly of the wing. The stiffening portion is in turn dimensioned to carry vertical loads.

13 Claims, 4 Drawing Sheets

ARRANGEMENT FOR FASTENING STRINGERS TO AIRCRAFT WING RIBS

BACKGROUND OF THE INVENTION

The invention relates to a wing structure in an aircraft and a fastening element and a wing rib for fastening stringers to a wing frame of the aircraft.

FIG. 1 shows a typical structure of an aircraft wing in cross-section. The wing comprises an upper skin 1 forming the upper surface of the wing and a lower skin 2 forming the lower surface of the wing. A support structure of the wing is placed between the skin plates and comprises transverse wing ribs 3 in relation to the longitudinal direction E of the wing. The wing ribs are arranged at a predetermined distance from one another. The wing rib is typically made of a plate material and the crosscut thereof substantially resembles the letter C and comprises a vertical plate and horizontal plates in the upper and lower ends of the vertical plate. The forward edge of the wing also includes a front spar 4 and correspondingly the aft edge includes a rear spar 5. Several parallel stringers 6 fastened to the wing rib are placed longitudinally with the wing both on the upper surface and lower surface of the wing. In general, the crosscut of the stringer substantially resembles the letter L or T. The vertical portion of the stringer is arranged into recesses 3a formed on the upper and lower portions of the wing rib. The skins of the wing are further fastened to the horizontal outer surface of the stringers, as FIG. 2 shows. As heavy vertical loads are placed upon the wing rib the structure of the rib is generally stiffened by arranging vertical supports 7 at the side of the wing rib.

The wing frame is still at present made mainly of aluminium alloys applicable to aircraft manufacturing or of other light alloys. Furthermore, the different components of the wing frame are attached together using separate fastening portions made of metal. FIG. 3 shows an example of such a fastening portion 8. The fastening portions are riveted to the wing rib, and thereafter the stringer is riveted to the fastening portion. If the fastening portion is not for some reason exactly in the right place, a required number of shim plates is arranged between the fastening portion and the stringer in order to compensate for the dimensional deviations. As each joint typically comprises two or more fastening portions, whereof each one is separately riveted to the wing rib and correspondingly to the stringer, the assembly of the wing frame becomes laborious. The number of required components is also high, which naturally increases the weight of the structure. The manufacture of current wing structures is slow and expensive.

The aircraft industry aims to continuously develop lighter and at the same time more durable structures. Consequently, the composite structures are gradually replacing the use of aluminium and corresponding metals as the material for making wing frames. Tests have been carried out for making wing ribs of carbon fibre reinforced plastic. What has become a problem is that a dimensional accuracy equalling the one achieved when manufacturing conventionally using metal is not always achieved in composite production. The cure cycle of the composite cause deformations that are difficult to handle for the components to be made, whereas the metallic components can be machined in accurate dimensions. The dimensional deviations caused by the composite deformations lead to all kinds of problems when assembling the wing frames. The components must be fastened using fastening portions, which cannot be arranged in position owing to the dimensional deviation until the wing is in an assembling stage, thus making the assembly very difficult and slow.

BRIEF DESCRIPTION OF THE INVENTION

It is an object of the present invention to provide a new and improved system for fastening stringers in a wing frame to a wing rib.

The invention relates to an aircraft wing structure comprising an upper skin forming the upper surface of the wing and a lower skin forming the lower surface of the wing, and a wing frame between said skins, whereby the wing frame comprises at least one transverse wing rib and at least one longitudinal upper stringer, to which the upper skin is fastened and correspondingly at least one lower stringer, to which the lower skin is fastened, and also a front spar forming the forward edge of wing frame fastened to the wing rib and correspondingly a rear spar forming the aft edge of the wing frame, wherein the wing rib is an elongated portion comprising a first vertical side surface and correspondingly a second vertical side surface, whereby at least one elongated fastening element extending from the upper part of the side surface to the lower part of the side surface is arranged to at least one side surface of the wing rib, which fastening element comprises a substantially plate-like flexible portion, whose first longitudinal edge is fastened to be immovable to the side surface of the wing rib, and the second longitudinal edge of the flexible portion comprises a stiffening portion, the flexible portion in the fastening element is formed to be bendable in the longitudinal direction of the wing rib, whereby the flexible portion enables to move the stiffening portion a predetermined distance in the longitudinal direction of the wing rib, the first and second ends of the stiffening portion in the fastening element comprises fastening portions, from which the fastening element is fastened to the stringer on the upper surface side of the wing and correspondingly to the stringer on the lower surface side of the wing, and which stiffening portion in the fastening element is arranged to carry vertical loads between said stringers.

The invention also relates to a fastening element intended to fasten the components in the aircraft wing frame together, and the wing frame comprising at least one transverse elongated wing rib and at least one longitudinal stringer above the wing rib and correspondingly at least one stringer beneath the wing rib, and the fastening element being an elongated part which can be arranged onto the vertical side surface of the wing rib, the fastening element comprising a substantially plate-like flexible portion with a first longitudinal edge and a second longitudinal edge, whereby the first longitudinal edge of the flexible portion can be arranged onto the vertical side surface of the wing rib, the second longitudinal edge of the flexible portion in the fastening element comprises a stiffener, and a first fastening portion is formed at the first end of the stiffener and correspondingly a second fastening portion is formed at the second end of the stiffener for fastening the upper surface stringer and correspondingly the lower surface stringer of the wing, the structure of the stiffener in the fastening element is stiff and capable of carrying vertical loads, and the flexible portion in the fastening element is formed to be bendable in the transverse direction of the fastening element allowing the stiffening portion to be moved in the longitudinal direction of the wing rib by bending the flexible portion.

The invention further relates to a wing rib, which is a part of the aircraft wing frame, the wing rib being an elongated part made of fibre reinforced plastic intended to be arranged in the transverse direction of the wing and to which the longitudinal stringers on the upper and lower surface sides of the wing are intended to be fastened, the wing rib comprises a first vertical side surface and a second vertical side surface, whereby at least one side surface of the wing rib comprises at least one elongated fastening element, which is transverse in relation to the longitudinal axis of the wing rib and protrudes from the side surface, for connecting the stringer on the upper surface of the wing and the stringer on the lower surface of the wing to the wing rib, the fastening element comprises a stiffening portion, whose first end includes a first fastening portion and the second end a second fastening portion for fastening the stringers of the wing, and the stiffener in the fastening element is formed so as to carry the vertical loads between the stringers, a substantially plate-like flexible portion formed to bend in the transverse direction of the fastening element is placed between the stiffening portion and the wing rib, thus allowing the stiffening portion to be moved in the longitudinal direction of the wing rib by bending the flexible portion, the fastening element is made of fibre reinforced plastic and the fastening element is integrated into the structure of the wing rib so that at least a part of the reinforcing fibres and plastic matrix in the fastening element and the wing rib is common, the fastening element thus being a fixed structural part of the wing rib.

The essential idea of the invention is that one or more elongated fastening elements protruding from the side surface of the wing rib and extending from the upper part of the wing rib to the lower part of the wing rib are arranged to at least one side surface of the wing rib. Fastening portions are formed at the outer ends of the fastening elements for fastening the stringers of the wing, the fastening element thus functioning at the same time as the fastening element of the stringer on both the upper surface and the lower surface of the wing.

The fastening element comprises a substantially plate-like flexible portion, which is transverse in relation to the vertical side of the wing rib. The first longitudinal edge of the flexible portion is fastened to be immovable onto the side surface of the wing rib. The flexible portion is also dimensioned and shaped so that it may bend if necessary in relation to the planar surface thereof in the transverse direction, i.e. in the longitudinal direction of the wing rib. The second longitudinal edge of the flexible portion, in turn, comprises a stiffened portion that endures pressing and bending, thus allowing the stiffening portion to carry the loads in the vertical direction of the wing. Fastening portions are formed at both longitudinal ends of the stiffened portion for fastening the stringers of the wing.

The invention provides such an advantage that two stringers, one on the upper side of the wing and the other on the lower side of the wing, can be fastened using a single fastening element. The assembly of the wing frame is more rapid compared with prior art solutions, as the number of components to be joined and the number of joints to be performed is smaller. The structure is also less complicated and lighter. Furthermore, as the flexible portion in the fastening element compensates for the dimensional deviations possibly created during the manufacture and assembly of the components, the fastening elements can be fastened to the wing rib before the actual assembly. In such a case the assembly of the wing frame is easier and faster than before. Separate shim plates are no longer needed during assembly. Another factor that simplifies and lightens the structure is that vertical stiffeners need no longer be fastened to the wing ribs, as the stiffening portion in the fastening element carries vertical loads. The flexible portion fastened to the side of the wing rib stiffens the wing rib in the vertical direction.

The essential idea of a preferred embodiment is that the fastening portions formed at the stiffener ends are made to bend in the transversal direction of the fastening element. The fastening portions are both capable of bending separately, whereby the possible mutual deviation of the position of the stringers placed above and beneath the wing rib in the longitudinal direction of the wing rib can be compensated without a harmful torque being created to the fastening element structure.

The essential idea of a second preferred embodiment of the invention is that the stiffened portion is plate-like, and that is transversely arranged to the free longitudinal edge of the flexible portion. Then the crosscut of the fastening element substantially resembles the letter T or L. Such a fastening element is easy to manufacture and very light.

The essential idea of a third preferred embodiment of the invention is that the flexible portion comprises at least one cut-through opening. Such openings can in a simple way affect the stiffness of the flexible portion. The openings also reduce the weight of the structure. According to an application the flexible portion includes an elongated opening.

A fourth preferred embodiment of the invention provides the essential idea that the wing rib is made of fibre reinforced plastic, and that the fastening elements are integrated to the wing rib structure. The wing rib and the fastening elements form an integral unit, where the number of separate parts belonging to the wing structure is smaller and the number of joints to be made during assembly is reduced. Furthermore, the integral structure endures loads better and the structure thereof can be made lighter. According to an implementation the fastening element is a preproduced part, what is known as an insert, which can be arranged to the structure of the side surface of the wing rib when manufacturing the wing rib. The insert can, for example, be laminated or glued to the side of the wing rib. Still according to an implementation the fastening element is also made of fibre reinforced plastic and it is formed in the same mould and during the same manufacturing stage as the rest of the wing rib structure. Then the wing rib and the fastening elements are at least partly composed of common reinforcing fibres and matrix plastic. Moreover, the number of manufacturing stages is reduced and the manufacture is rapid. In an integrated structure the fastening element is attached to the wing rib without a discontinuation section, which is preferable regarding the strength of the structure. Some of the advantages of a composite structure in comparison with aluminium are, for example, a better stiffness and weight ratio and the fact that the composite properties can be controlled in many ways by selecting the reinforcing fibres and the matrix plastic appropriately and also by directing the reinforcing fibres.

In this application an aircraft refers to different airplanes, airships, satellites and possibly other equipment moving in the air.

Here, a wing refers, in addition to wings providing the lift of an aircraft, also to control surfaces used for controlling and managing aircrafts, such as elevators and rudders of airplanes, in the frame structures of which the invention in this application can be utilized.

BRIEF DESCRIPTION OF THE DRAWINGS

The invention will be explained in greater detail in the appended drawings, in which.

Figure 1:
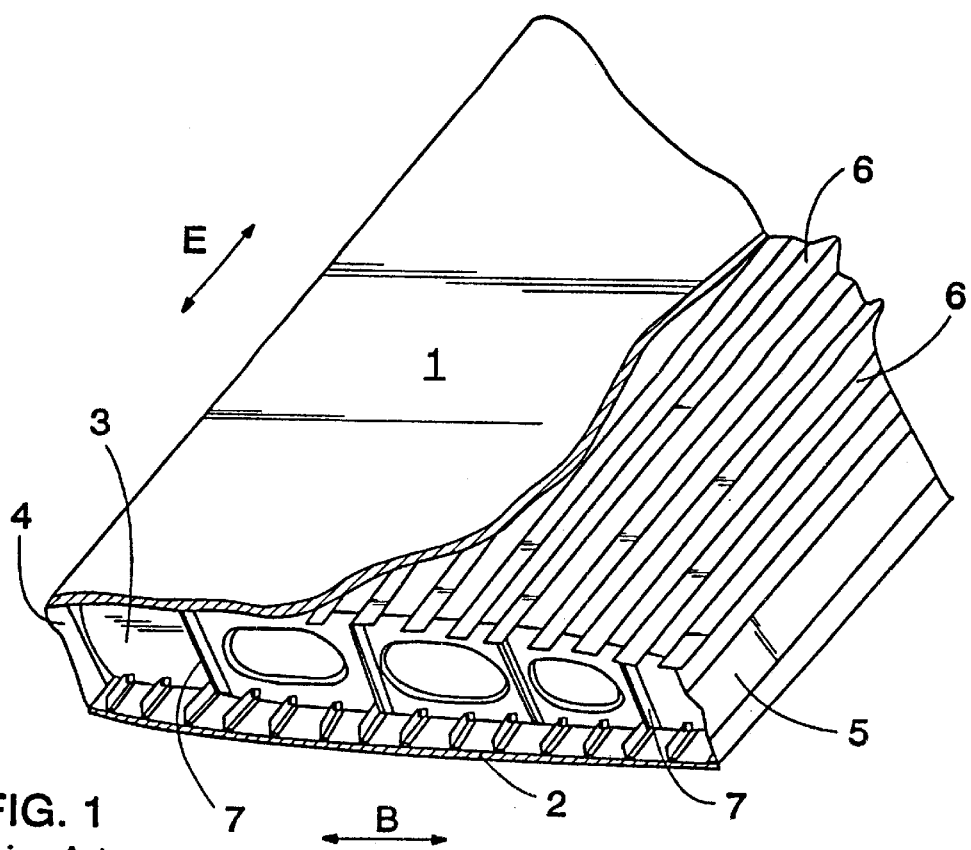
FIG. 1 shows in perspective and partly in crosscut a typical structure of an airplane wing.

The reference numerals in the Figures are identical, and for the sake of clarity the Figures are significantly simplified.

Figure 2:
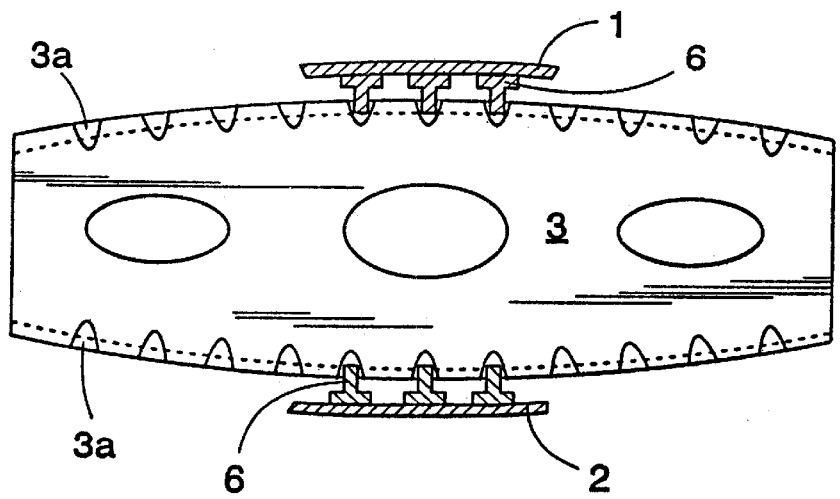
FIG. 2 shows the wing structure according to FIG. 1 seen from the longitudinal direction E.
Figure 3:
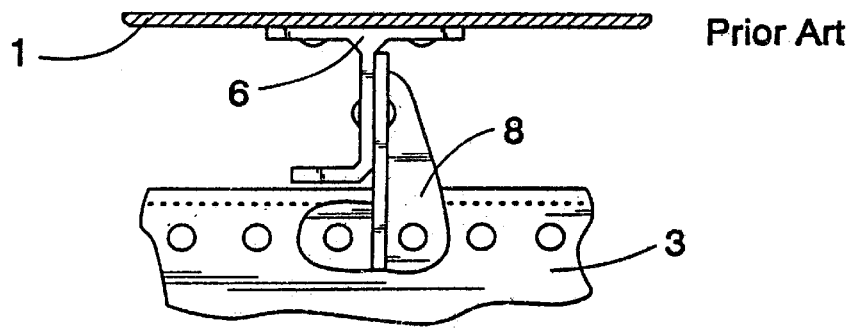
FIG. 3 shows a prior art arrangement, in which a stringer of the wing is fastened to a wing rib using a separate fastening portion.

As for FIGS. 1 to 3, reference is made to the part describing prior art in this application where the wing structures shown in the Figures are explained.

DETAILED DESCRIPTION OF THE INVENTION

Figure 4:
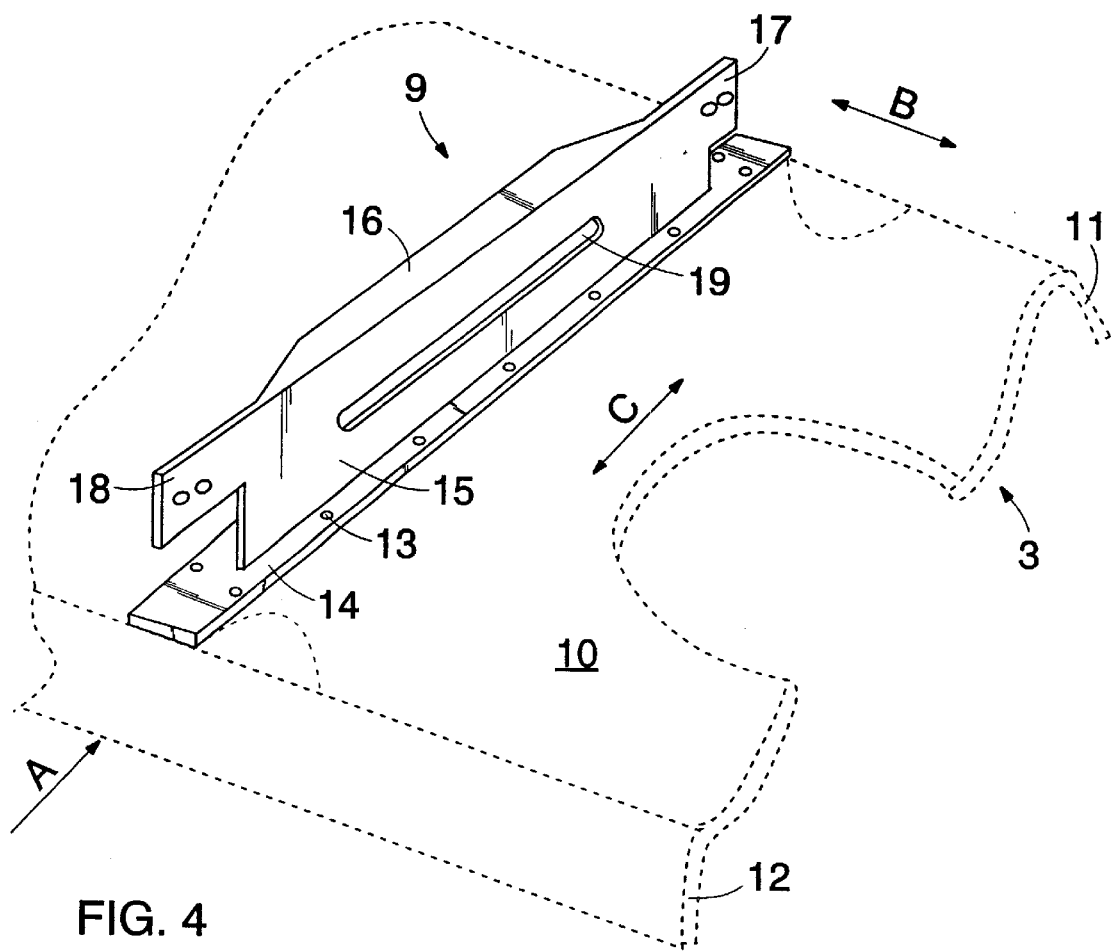
FIG. 4 is a schematic and perspective view showing a structure of the invention.

FIG. 4 shows an implementation of a fastening element according to the invention. The fastening element 9 is an elongated part, whose length corresponds at least nearly with the height of a vertical side 10 of a wing rib 3 so that the fastening element extends to recesses 3a formed on an upper plate 11 and correspondingly on a lower plate 12 of the substantially C-shaped wing rib. It should be mentioned that the crosscut of the wing rib can also have a different shape than the letter C. The fastening element 9 shown in FIG. 4 is a part produced in a separate stage and can be made of, for example, aluminium plate or fibre reinforced plastic. The structure of the fastening element 9 comprises a flange part 14 parallel to the side surface 10 of the wing rib, the fastening element being fastened to the wing rib 3 from the flange part. Appropriate fastening elements 13 such as rivets, screws or glue can be used for fastening. The flange part can be dimensioned and shaped according to need in order to be fastened. A flexible portion 15 is transversely placed in relation to the flange part. The flexible portion is a substantially plate-like structure that extends a predetermined distance outwards from the side surface 10 of the wing rib. The flexible portion also comprises a stiffening portion 16 at the free longitudinal edge. In this case the stiffener 16 is plate-like, a transverse portion in relation to the flexible portion, forming together with the flexible portion 15 a structure whose crosscut resembles the letter L turned upside down. The ends of the stiffening portion 16 comprise fastening portions 17 and 18, to which longitudinal supports are fastened using appropriate fastening elements, such as rivets, screws or glue. The fastening portions transfer the loads placed upon the skin plates and further to the stringers to the fastening elements. The shape of the stiffening portion and the thickness of the plate are dimensioned so that the fastening element is firm enough to carry the vertical loads placed thereupon. The plate thickness, material and structure of the flexible portion are in turn selected so that the desired transverse bending is achieved in direction B. Bending the fastening element thus allows to compensate for the possible dimensional deviations of the components and to alleviate the assembly of the structure. Even though the transverse stiffness regarding the planar surface of the flexible portion is dimensioned to be small, the flexible portion is irrespective thereof capable of transferring shear force between the stiff portion and the wing rib, in which case a part of the vertical loads on the wing is conveyed to the wing rib by means of the flexible portion. The flexible portion 15 may comprise a longitudinal opening 19 extending through the flexible portion from the first side thereof to the second. The number of openings, as well as the dimensioning and shape of the flexible portion are planned according to need. The opening 19 allows in a simple way to adjust the stiffness of the flexible portion as desired. This also allows the fastening element to be made of a single plate material, whose thickness and stiffness properties are dimensioned in accordance with the stiffening portion. Then the stiffness of the flexible portion is reduced by means of the openings 19. For example, a fastening element of aluminium can be rapidly and economically produced in modern automatic machines. Furthermore, several openings can be formed into the flexible portion in accordance with a preplanned pattern so that the flexible portion bends when loaded as desired. In some cases the flexible portion may comprise such a number of openings that it acts like a grid.

Figure 5:
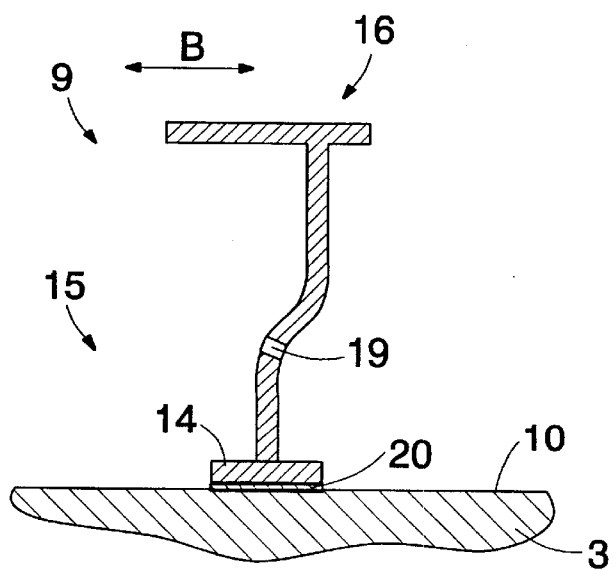
FIG. 5 is a schematic and crosscut view showing a second fastening element of the invention seen from the longitudinal direction C thereof.

FIG. 5 shows a crosscut of the fastening element 9 substantially resembling the letter T in crosscut seen from direction A. The flange portion 14 in the fastening element is fastened with gluing agent 20 to the side surface 10 of the wing rib 3. In this application the flexible portion 15 is curved in crosscut, whereby the assembly of the fastening element into a correct position in the wing rib, for example into recesses 3a formed on the upper and lower plates, is much easier. The joint between the fastening element and the wing rib is at a different point in the longitudinal direction B of the wing rib than the joint between the fastening element and the stringer.

Figure 6:
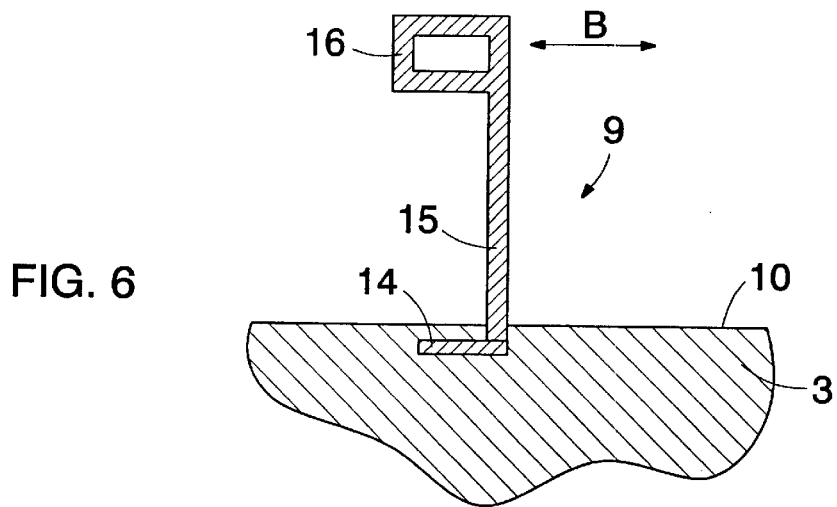
FIG. 6 is a schematic and crosscut view showing a third fastening element of the invention seen from the longitudinal direction C thereof, FIG. 7 schematically shows a part of the wing structure seen from the longitudinal direction B of the wing rib.

The crosscut of the fastening element 9 shown in FIG. 6 comprises a tubular stiffening portion 16. The stiffening portion can be dimensioned and shaped in various ways. The flexible portion between the stiffening portion and the flange portion 14 is in this case a straight plate. The fastening element can for example be made of metal or plastic by casting. Thereafter the preproduced fastening element can be fastened from the flange portion to the side surface 10 of the wing rib as shown in FIGS. 4 and 5. Alternatively the fastening element is an insert arranged to the wing rib structure, when manufacturing a composite wing rib 3, for example laminated with the surface layers of the side 10 of the wing rib as shown in FIG. 6. Then the wing rib and the fastening element are integrated into a single entity.

Figure 7:
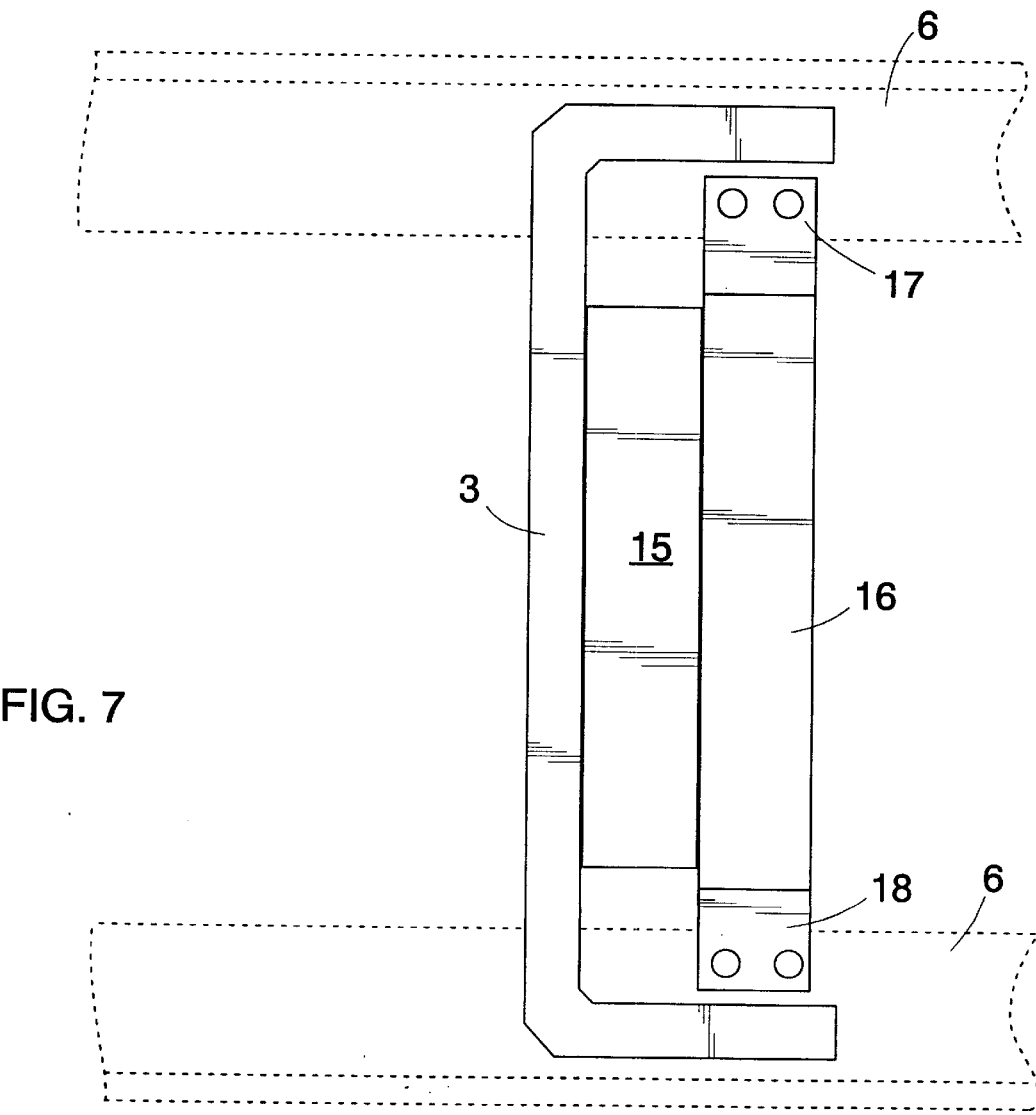

FIG. 7 shows a fastening element according to FIG. 6 seen from the longitudinal side of the wing rib 3. Deviating from FIG. 4 the fastening element is now arranged onto the opposite side surface of the substantially C-shaped wing rib, in this case between the horizontal plate parts of the wing rib 3. The ends of the tubular stiffening portion 16 include fastening portions 17 and 18, to which the stringers 6 are fastened. The structure of the fastening portions 17 and 18 is plate-like and preferably dimensioned so that the fastening portions are both separately able to bend in the longitudinal direction of the wing rib, in different directions if needed, if the instalment of stringers so requires. The entire stiffening portion 16 can, in turn, move in the longitudinal direction of the wing rib 3 on account of the flexibility of the flexible portion 15.

Figure 8:
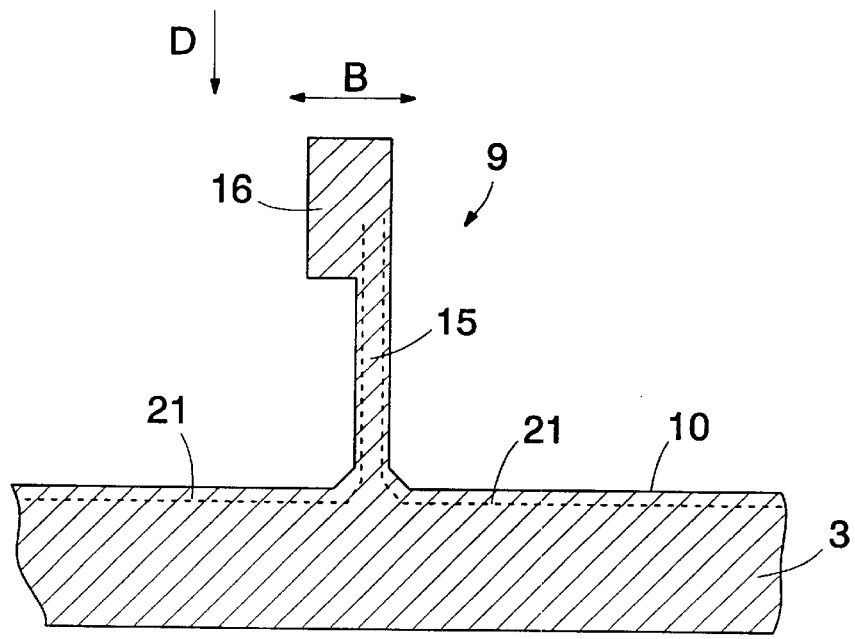
FIG. 8 is a schematic and crosscut view showing a fourth fastening element of the invention seen from the longitudinal direction C thereof, and FIG. 9 schematically shows a part of the wing of the invention seen from the longitudinal direction E of the wing.

FIG. 8 shows an integrated part formed of the wing rib 3 and the fastening element 9 made of fibre reinforced plastic. Such a structure can be manufactured in a single stage and in a single mould. For example, carbon fibre, aramid fibre or the like can be used as the reinforcing fibres, and the matrix plastic can be for instance epoxy resin or another plastic material known per se and appropriate for the purpose. In this structure the wing rib and the fastening element have common reinforcing fibres and matrix plastic. The dashed line in the Figure illustrates how the reinforcing fibres 21 placed on the wing rib surface are turned upwards, thus extending to the structure of the fastening element. Correspondingly the reinforcing fibres of the fastening element may extend to the structure of the wing rib. The plate thickness of the stiffening portion 16 clearly exceeds that of the flexible portion 15. The reinforcing fibres of the flexible portion 15 are directed in such a manner that the desired flexibility in direction B is achieved. Correspondingly the reinforcing fibres in the stiffening portion are directed so that the vertical loads can be received without the danger of the stiffening portion collapsing.

Figure 9:
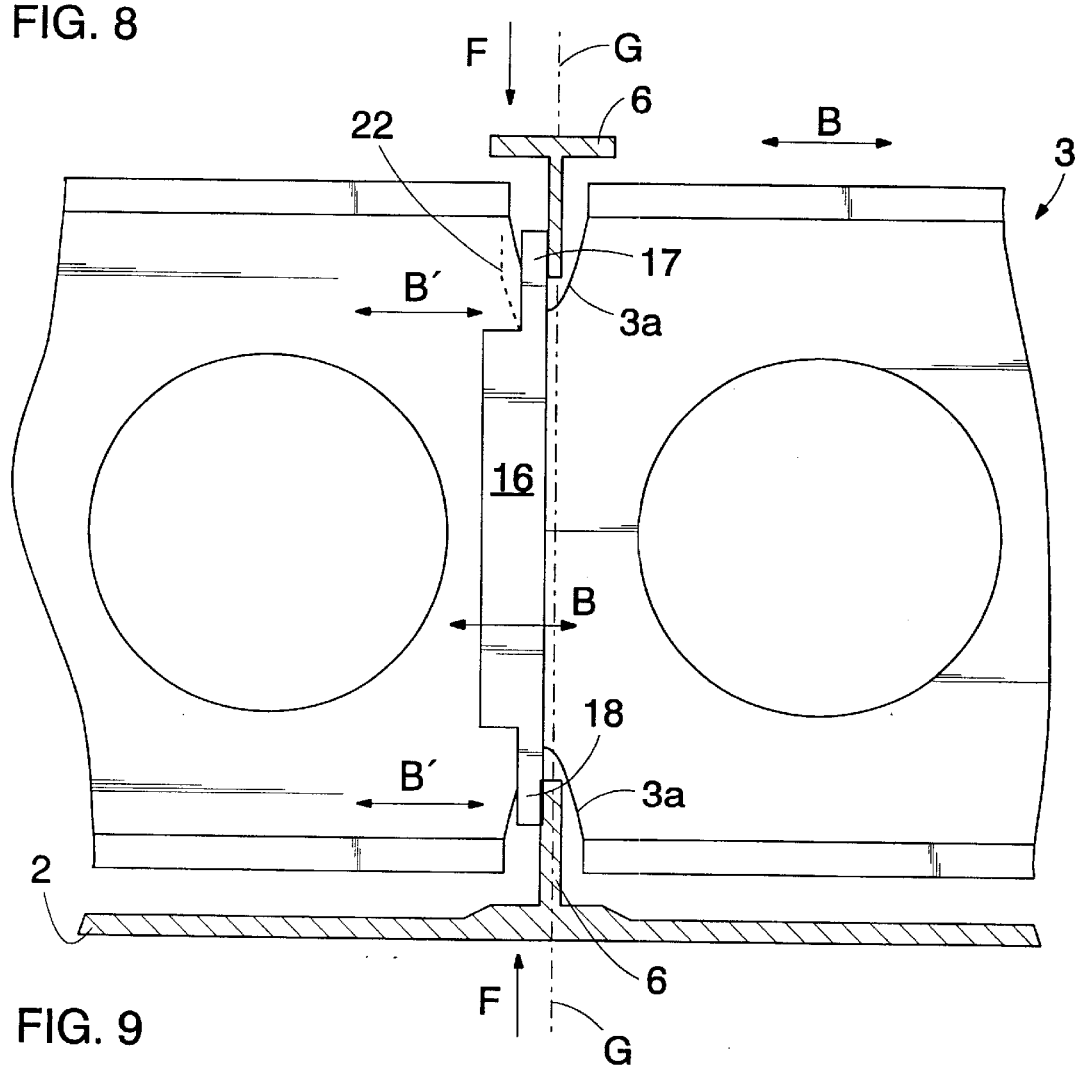

FIG. 9 shows the structure according to FIG. 8 from direction D. The upper end of the stiffening portion 16 in the fastening element comprises a fastening portion 17 and the lower end comprises a fastening portion 18, both being fastened to the stringer 6. The plate thickness of the fastening portions 17 and 18 is preferably smaller than the one in the stiffening portion 16, in which case both fastening portions can separately bend in the longitudinal direction B' of the wing rib 3, if the stringer on the upper or lower side of the wing is for some reason not in the same line G. A dashed line 22 illustrates the bending of the upper fastening portion. The flexible portion also allows the fastening element to move in direction B if required. The stiffening portion and the fastening portions transfer the main part of the vertical loads F of the wing between the stringers 6.

As illustrated, the lower stringer 6 is integrated into the structure of the lower skin plate 2. This structure is advantageous particularly when the skin plate is made of composite material.

The drawings and the specification associated thereto are merely intended to illustrate the inventive idea. As to the details, the invention may vary within the scope of the claims.

What is claimed is:

1. An aircraft wing structure comprising an upper skin forming the upper surface of the wing and a lower skin forming the lower surface of the wing, and a wing frame between said skins, whereby the wing frame comprises at least one transverse wing rib and at least one longitudinal upper stringer, to which the upper skin is fastened and correspondingly at least one lower stringer, to which the lower skin is fastened, and also a front spar forming the forward edge of wing frame fastened to the wing rib and correspondingly a rear spar forming the aft edge of the wing frame, wherein the wing rib is an elongated portion comprising a first vertical side surface and correspondingly a second vertical side surface, whereby at least one elongated fastening element extending from the upper part of the side surface to the lower part of the side surface is arranged to at least one side surface of the wing rib, which fastening element comprises a substantially plate-like flexible portion, whose first longitudinal edge is fastened to be immovable to the side surface of the wing rib, and the second longitudinal edge of the flexible portion comprises a stiffening portion, the flexible portion in the fastening element is formed to be bendable in the longitudinal direction of the wing rib, whereby the flexible portion enables to move the stiffening portion a predetermined distance in the longitudinal direction of the wing rib, the first and second ends of the stiffening portion in the fastening element comprises fastening portions, from which the fastening element is fastened to the stringer on the upper surface side of the wing and correspondingly to the stringer on the lower surface side of the wing, and which stiffening portion in the fastening element is arranged to carry vertical loads between said stringers.

2. A wing structure as claimed in claim 1, wherein the fastening portions in the fastening element are formed to bend in relation to the longitudinal direction of the wing rib.

3. A wing structure as claimed in claim 1, wherein the wing rib is made of fibre reinforced plastic, and wherein the fastening element is a preproduced insert arranged to the side surface structure of the wing rib when manufacturing the wing rib, and the wing rib and fastening element thus forming a single entity.

4. A wing structure as claimed in claim 1, wherein the wing rib and fastening element are made of fibre reinforced plastic, and wherein the fastening element is formed onto the side surface of the wing rib during manufacture using at least partly the same reinforcing fibres and plastic matrix, and the wing rib and fastening element thus forming a single structural entity.

5. A fastening element intended to fasten the components in the aircraft wing frame together, and the wing frame comprising at least one transverse elongated wing rib and at least one longitudinal stringer above the wing rib and correspondingly at least one stringer beneath the wing rib, and the fastening element being an elongated part which can be arranged onto the vertical side surface of the wing rib, the fastening element comprising a substantially plate-like flexible portion with a first longitudinal edge and a second longitudinal edge, whereby the first longitudinal edge of the flexible portion can be arranged onto the vertical side surface of the wing rib, the second longitudinal edge of the flexible portion in the fastening element comprises a stiffener, and a first fastening portion is formed at the first end of the stiffener and correspondingly a second fastening portion is formed at the second end of the stiffener for fastening the upper surface stringer and correspondingly the lower surface stringer of the wing, the structure of the stiffener in the fastening element is stiff and capable of carrying vertical loads, and the flexible portion in the fastening element is formed to be bendable in the transverse direction of the fastening element allowing the stiffening portion to be moved in the longitudinal direction of the wing rib by bending the flexible portion.

6. A fastening element as claimed in claim 5, wherein the first longitudinal edge of the flexible portion comprises a transverse flange portion, for fastening the fastening element to the vertical side surface of the wing rib.

7. A fastening element as claimed in claim 5, wherein a first and a second fastening portion formed at the ends of the stiffening portion are flexible in the transverse direction of the fastening element allowing the fastening portions to be bent irrespective of one another in the transverse direction of the fastening element.

8. A fastening element as claimed in claim 5, wherein the stiffening portion in the fastening element comprises a transverse plate-like structure in relation to the flexible portion.

9. A fastening element as claimed in claim 5, wherein the stiffening portion in the fastening element comprises a parallel portion in relation to the flexible portion, the plate thickness of the parallel portion exceeding the one of the flexible portion.

10. A fastening element as claimed in claim 5, wherein the crosscut of the stiffening portion in the fastening element is tubular.

11. A fastening element as claimed in claim 5, wherein the flexible portion comprises at least one opening extending from the first side to the second side of the flexible portion.

12. A wing rib, which is a part of the aircraft wing frame, the wing rib being an elongated part made of fibre reinforced plastic intended to be arranged in the transverse direction of the wing and to which the longitudinal stringers on the upper and lower surface sides of the wing are intended to be fastened, the wing rib comprises a first vertical side surface and a second vertical side surface, whereby at least one side surface of the wing rib comprises at least one elongated fastening element, which is transverse in relation to the longitudinal axis of the wing rib and protrudes from the side surface, for connecting the stringer on the upper surface of the wing and the stringer on the lower surface of the wing to the wing rib, the fastening element comprises a stiffening portion, whose first end includes a first fastening portion and the second end a second fastening portion for fastening the stringers of the wing, and the stiffener in the fastening element is formed so as to carry the vertical loads between the stringers, a substantially plate-like flexible portion formed to bend in the transverse direction of the fastening element is placed between the stiffening portion and the wing rib, thus allowing the stiffening portion to be moved in the longitudinal direction of the wing rib by bending the flexible portion, the fastening element is made of fibre reinforced plastic and the fastening element is integrated into the structure of the wing rib so that at least a part of the reinforcing fibres and plastic matrix in the fastening element and the wing rib is common, the fastening element thus being a fixed structural part of the wing rib.

13. A wing rib as claimed in claim 12, wherein the first and second fastening portion are formed to be flexible in the longitudinal direction of the wing rib allowing the first and the second fastening portion to be bent irrespective of one another in the longitudinal direction of the wing rib.

\* \* \* \* \*